United States Patent [19]
Adler et al.

[11] Patent Number: 6,088,123
[45] Date of Patent: Jul. 11, 2000

[54] DITHERING MASKS WITH VERY LARGE PERIODS

[75] Inventors: Roy Lee Adler, Chappaqua; Gerhard Robert Thompson, Wappingers Falls; Charles P. Tresser, Mamaroneck; Chai Wah Wu, Ossining, all of N.Y.

[73] Assignee: International Business Machines Corporation, Armonk, N.Y.

[21] Appl. No.: 08/976,248

[22] Filed: Nov. 21, 1997

[51] Int. Cl.$^7$ .................................................. H04N 1/40

[52] U.S. Cl. ........................... 358/1.9; 358/456; 358/457; 382/237

[58] Field of Search ..................................... 358/455, 456, 358/457, 458, 534, 535, 536, 1.9; 382/232, 237

[56] References Cited

U.S. PATENT DOCUMENTS

| | | | |
|---|---|---|---|
| 4,903,147 | 2/1990 | Kanno et al. | 358/455 |
| 5,107,349 | 4/1992 | Ng et al. | 358/457 |
| 5,734,752 | 3/1998 | Knox | 382/237 |
| 5,867,607 | 2/1999 | Shibuya et al. | 382/270 |

*Primary Examiner*—Thomas D. Lee
*Attorney, Agent, or Firm*—Whitham, Curtis & Whitham; Stephen C. Kaufman, Esq.

[57] ABSTRACT

A method and apparatus for halftoning utilizes a truly aperiodic mask with memory requirements much smaller than the mask itself. The mask is constructed of several smaller compatible masks and a selector which selects between the smaller masks. In this way the computation of a large aperiodic mask is replaced by the computation of several much smaller masks. Using this technique, watermarks may be embedded for encrypting information in such a way that the quality of the image is not compromised.

13 Claims, 5 Drawing Sheets

FIG.1

$u' = u \bmod m$, $v' = v \bmod N$

ALGORITHM:

IF $I_{u,v} \geq a_{u',v'}$ THEN $D_{u,v} = 1$ (BLACK)

IF $I_{u,v} < a_{u',v'}$ THEN $D_{u,v} = 0$ (WHITE)

FIG.2

$$C = \begin{array}{|c|c|c|} \hline A & B & B \\ \hline A & A & B \\ \hline \end{array}$$

DITHERING MASKS WITH VERY LARGE PERIODS

BACKGROUND OF THE INVENTION

1. Field of the Invention

The present invention generally relates to digital halftoning and, more particularly, to a method and apparatus for halftoning which constructs and utilizes a dithering mask with memory requirements much smaller than the mask itself.

2. Background Description

Most printers today can print in only a limited number of colors. Digital halftoning is a technique for printing a picture (or more generally displaying it on some two-dimensional medium) using small dots with a limited number of colors such that it appears to consist of many colors when viewed from a proper distance. For example, a picture of black and white dots can appear to display grey levels when viewed from some distance.

The fastest and most commonly used methods for digital halftoning are dithering algorithms which use threshold arrays, also called dither matrices or dither masks. The original forms of these arrays used periodic patterns of threshold values which can have an unpleasant rendering at certain grey levels. This invention discloses a method and apparatus which halftones an image using a truly aperiodic mask, thus avoiding periodic patterns.

Concepts related to periodicity are central to this invention. Consequently, we first establish some terminology to be used through this discussion. In the formalism of standard mathematics we denote by $\mathbb{R}$ the set of all real numbers, and by $\mathbb{R}$ n-dimensional space. We also denote by Z the set of integers $0, \pm1, \pm2, \ldots$, and by $Z^n$ the set of n-tuples of integers. We call a function f from $\mathbb{R}$ to $\mathbb{R}$ periodic with period $(p_1, p_2, \ldots, p_n)$ if for all $(x_1, x_2, \ldots, x_n)$ in $\mathbb{R}$ and $(k_1, k_2, \ldots k_n) \in Z^n$ $$f(x_1+k_1p_1, x_2+k_2p_2, \ldots, x_n+k_np_n)=f(x_1, x_2, \ldots, x_n).$$

Periods are not unique. There may be a smaller period $(q_1, \ldots, q_n)$ where each $q_i$ is a factor of $p_i$. We say a function from a hyper rectangle $\mathcal{R}$ in $\mathbb{R}$ is periodic if it is the restriction to $\mathcal{R}$ of a periodic function.

Usually a page P is much bigger than a dithering mask M so that several copies of the mask are needed to cover the page. Thus, if the input image is a uniform grey, then the pattern of data generated by the mask is the restriction to P of a periodic function having one period given by the dimensions of the mask. It also might have smaller periods. Because of that in the context of printing one departs from mathematical usage and says that a mask is periodic if the patterns it yields for uniform grey levels have a period smaller than the size of the mask or if the mask is small itself in the sense that every threshold level is represented approximately once (e.g., a 16×16 mask to render 256 grey levels). Otherwise, the mask is usually called aperiodic which means there are no periods smaller than the one due to the size of the mask and the mask is big with respect to the number of grey levels to be rendered (e.g., a 128×128 mask to render 256 grey levels).

We shall disclose how to construct and utilize masks which are truly aperiodic in the sense that no subpattern is repeated periodically when rendering the various uniform greys on a page, not even a period the size of the mask, yet using only a small amount of memory.

One way to reduce memory requirements for a mask would be to generate random threshold values on the fly while printing. This requires more computation than a table lookup and comparison and would produce a much poorer quality output for two reasons:

One, too much randomness in the distribution of threshold values blurs the image.

Two, blue noise, or noise with the low frequencies attenuated, gives the best visual effect, as described for instance in "Dithering with blue noise", *Proc. IEEE* 75, no.1 (1988) pp. 56–79, by R. Ulichney, and no method is known to generate blue noise on the fly by considering only the current pixel.

Methods to construct dithering masks with blue noise were proposed, for instance, in U.S. Pat. No. 5,111,310 to K. J. Parker and T. Mitsa, in "Digital halftoning using a blue noise mask", *Proc. SPIE* 1452 (1991) pp. 47–56, by T. Mitsa and K. J. Parker, and in "The void-and-cluster method for dither array generation", *Proc. SPIE* 1913 (1993) pp. 332–343, by R. Ulichney.

Once a mask is devised for halftoning greyscale pictures, previous art allows it to be used for color pictures. The individual color planes are halftoned using rotated periodic masks, in order to avoid a moire pattern, or other changes are made to masks such as described for instance in U.S. Pat. No. 5,341,228 to K. J. Parker and T. Mitsa in the case of a blue noise mask.

Most of these techniques and others are reviewed in the book *Digital Halftoning*, (MIT Press, Cambridge, Mass. 1987) by R. Ulichney, which is a general reference for digital halftoning.

PROBLEMS TO BE SOLVED

Blue noise masks are usually presented in the literature as being aperiodic, but they do have a period, namely, the dimensions of the mask. This periodicity is detectable, with unpleasant effect, in prints made using such masks. For all practical purposes, building a truly aperiodic mask is not necessary since any given printer only prints pictures with some maximal size. A mask with size equal to the maximal size of the output could reasonably be considered as truly aperiodic for all practical purposes, but such a large mask would be impractical to use and very difficult to generate.

This invention gives a practical method to generate a truly aperiodic mask by using non-periodic repetitions of smaller specially constructed compatible masks, possibly with blue-noise characteristics. Both the storage and construction requirements are limited to a set of smaller masks and a small supplementary array.

SUMMARY OF THE INVENTION

It is therefore an object of the present invention to provide a method and apparatus for halftoning utilizing a truly aperiodic mask with memory requirements much smaller than the mask itself.

It is another object of the invention to provide a halftoning mask in which watermarks may be embedded for encrypting information in such a way that the quality of the image is not compromised.

According to the invention, there are provided halftoning masks which are truly aperiodic for all practical purposes. With n standing for the memory size of a mask, and k×n standing for the number of pixels of the largest picture to be printed with a given printer, our invention will disclose how to keep a mask of size k×n and with no period smaller than k×n in a memory of order O(n+k). Typically, an image of eight inches by ten inches printed at 600 dots per inch contains 28,800,000 pixels. We explain how to print such a picture with an aperiodic mask kept in memory as a set of arrays containing less than 100,000 numbers, and possibly much less if required by the printer's characteristics. Besides improving the quality of the prints, this invention can also embed watermarks in the print with no quality loss. These watermarks occupy the full range of the picture, and allow the encoding of a variety of information into the picture. If L+1 is the number of grey levels to be represented, any m by n matrix $M=\{a_{i,j}\}$ we consider in this description is an array of numbers between 0 and L. These numbers represent threshold levels.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
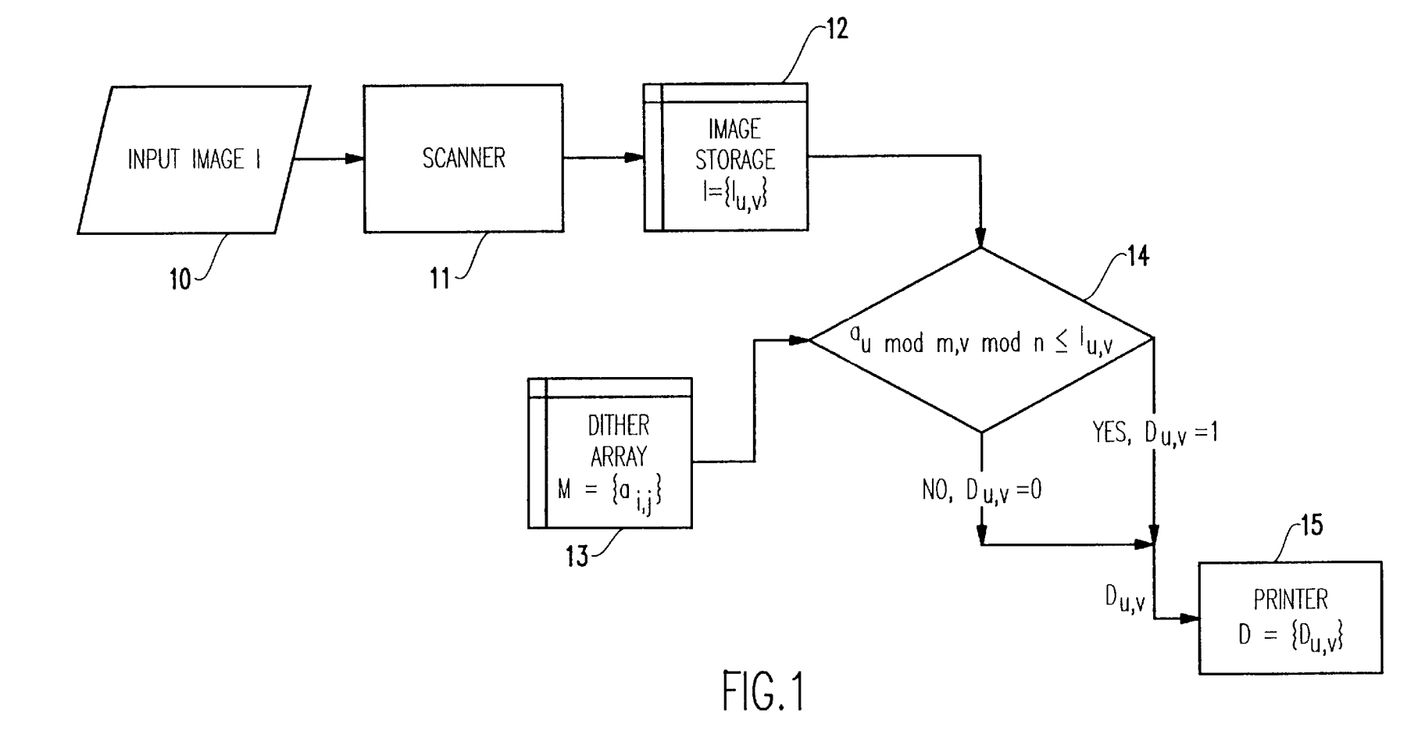
FIG. 1 is a block diagram of a halftoning system using a traditional dither algorithm.
Figure 2:
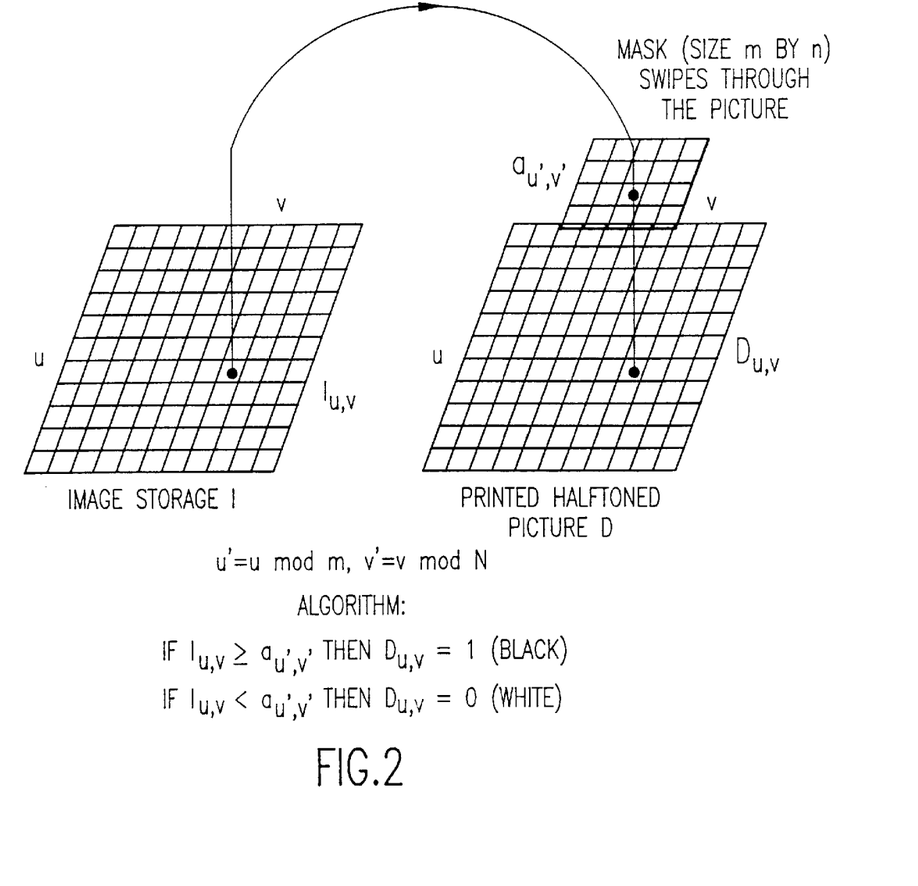
FIG. 2 is a diagram to further elucidate the operation of the algorithm in FIG. 1.

Referring now to the drawings, and more particularly to FIG. 1, there is shown in block diagram form the data flow from the input image to the printer. More specifically, the input image 10 is scanned by a scanner 11 and stored in image storage 12 as image $I_{u,v}$, where (u,v) is the pixel location. A dither matrix array 13 is used to halftone the image in storage 12. More precisely, using a m by n dither matrix $M=\{a_{i,j}\}$ in dither matrix array 13, the pixel at location (u,v) in image storage 12 will get printed as a black dot if and only if the grey level on the image to be printed at location (u,v) is greater than or equal to $a_{u',v'}$, where u'=u mod m, v'=v mod n. This is determined in the decision function 14, the output of which is sent to the printer 15. The decision function is illustrated in FIG. 2. As usual in number theory, c mod d stands for the remainder of the division of c by d.

Figure 3:
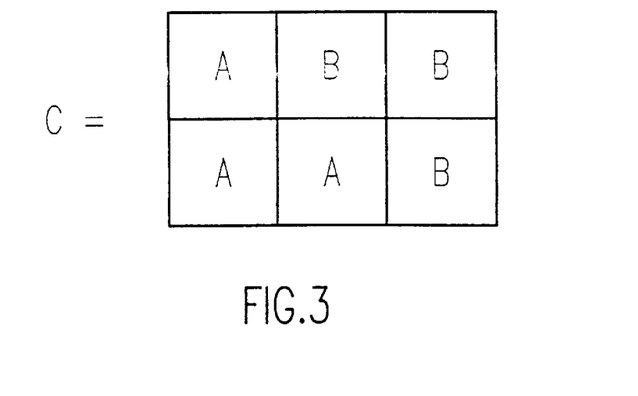
FIG. 3 is a diagram showing the structure of the matrix C in terms of the matrices A and B as used in the practice of the invention.

To implement our invention, we first construct T>1 compatible masks with no period smaller than their size. Compatible masks in this invention means that these masks can be put interchangeably side by side to halftone an image and the resulting patterns show little or no trace of artifacts due to the use of more than one mask. An example of such artifacts could be due to the boundaries between masks. In the rest of the discussion, we will only consider the case when T=2 for clarity, but other cases can be implemented in a similar way. If L+1 is the number of grey levels to be represented, the two masks are m by n matrices $A=\{a_{i,j}\}$ and $B=\{b_{i,j}\}$. To construct these masks as compatible, one could construct one blue noise (or any other kind of aperiodic) mask A and then obtain B by modifying A within its boundaries as was done in K. Knox and S-G. Wang, "Digital watermarks using stochastic screens," 1997 *IS&T/SPIE Symposium on Electronic Imaging Science and Technology*. This would not be a satisfying solution to the aperiodicity problem since the same boundary would repeat everywhere. Instead, we construct a 2 m by 3 n matrix C which is made of three copies of the matrix A and three copies of the matrix B, so that the upper half of C reads ABB and the lower part of C read AAB (more complex combinations may also be used). This structure is represented in FIG. 3. If C is a satisfactory aperiodic mask (for instance a blue noise mask) satisfying the structure in FIG. 3, then A and B are satisfactory aperiodic masks which are compatible with each other and they can be used in FIG. 4. One particular way to perform the construction of such a matrix C will be disclosed, but the method one chooses to use to construct C does not affect the rest of the invention.

In usual dithering, one uses one mask and swipes it across the image to be printed, as illustrated in FIG. 2. Instead, according to our invention, one selects successively one of the two masks according to an aperiodic sequence of two symbols. We will denote the two symbols A and B. It will be clear whether A and B denote symbols or dither matrices. This solves the aperiodicity problem in the strict sense. However, as such, the process is not necessarily satisfactory since the aperiodic sequence might have long successions of one of the symbols. Accordingly, we will disclose how to get good aperiodic sequences, by which we mean sequences which do not generate discernable patterns which are undesirable; for example, patterns such as long lines, long columns, or big blocks of the same symbol. There are several ways to generate aperiodic sequences. One of them is given in the description of the preferred embodiment.

Figure 4:
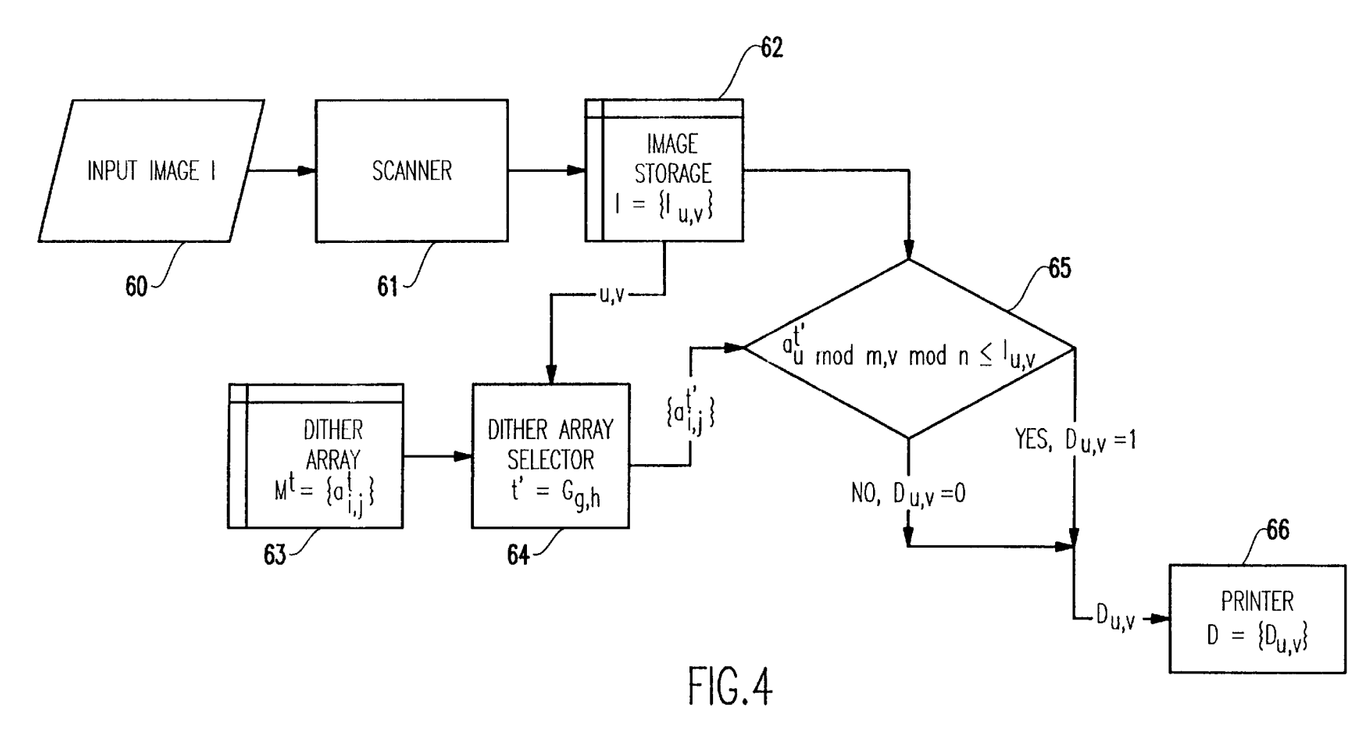
FIG. 4 is a block diagram of a halftoning system on which the invention may be implemented.

More precisely, our invention implements a dithering algorithm using more than one mask. Referring to FIG. 4, its operation is described as follows. In FIG. 4, there is shown in block diagram form the data flow from the input image to the printer. More specifically, the input image 60 is scanned by a scanner 61 and stored in image storage 62 as image $I_{u,v}$, where (u,v) is the pixel location. The collection of T m by n dither matrices $M^t=\{a^t_{i,j}\}$ (where the members of the set $\{a^t_{i,j}\}$ for t=0, ..., T−1 are numbers between 0 and L which represent threshold levels) are stored in dither arrays 63. Given u and v, the integers g and h are defined as the smallest integer larger than u/m and v/n, respectively. G is a matrix with entries in the range $\{0,1, \ldots, T-1\}$. The integer $t'=G_{g,h}$ is calculated in dither array selector 64. Dither array selector 64 then selects the dither mask $M^{t'}$. The pixel at location (u,v) in image storage 62 will get printed as a black dot if and only if the grey level on the image to be printed at location (u,v) is at least equal to $a_{u',v'}^{t'}$, as determined in decision function 65. This printing decision ($D_{u,v}$) is then sent to the printer 66. Here, we have set u'=u mod m, v'=v mod n. For the effective mask to be aperiodic, the entries of G should form an aperiodic array. For the case of T=2, G is a matrix of 0s and is which form an aperiodic array.

Preferred Embodiment for Very Aperiodic Sequences

To generate good aperiodic sequences, we borrow methods from symbolic dynamics. As an example, one can use the Thue-Morse sequence which is well known by people working in branches of mathematics and computer sciences. Arbitrarily long segments of this sequence can be obtained by the substitution which replaces A by AB and B by BA in the previous segment. The first segment is simply A or B. For example, a series of segments using this method is A, AB, ABBA, ABBABAAB, ABBABAABBAABABBA, ... This is continued until a sequence of the desired length is obtained.

More precisely, one constructs an array $X=\{S_i\}$ as follows:

Write 0 for A and 1 for B: One generates a sequence of 0s and is which is readily reinterpreted as a sequence of As and Bs.

Initialize the counter j at 1 and set $s_1=0$ or $s_i=1$.

Increment X at each step by reading $s_j$, setting $S_{2(j-1)+1}=s_j$ and $s_{2(j-1)+2}=1-s_j$, and replacing j by j+1.

Repeat the previous step until j is deemed large enough. The first sequences one gets this way read 0, 01, 0110, 01101001 if $s_1=0$ and 1,10, 1001, 10010110 if $s_1=1$.

Any mask one obtains using aperiodic sequences of As and Bs (where the symbols A and B represent two smaller masks or matrices) can be thought of as a matrix of blocks A and B. These blocks are arranged in lines of blocks and columns of blocks which we call superlines and supercolumns, respectively. One gets a good aperiodic matrix by choosing a segment of the Thue-Morse sequence as the top superline, and segments of the Thue-Morse sequence as supercolumns. The aperiodic matrix resulting from replacing A by 0 and B by 1 will be used as matrix G in FIG. 4.

The aperiodic sequence of As and Bs can also be used as a watermark. By varying the aperiodic sequence, for instance choosing different blocks of the Thue-Morse sequence, the watermark can be different for each print which is made.

Other substitutions may be used instead of the substitution we used here to present the Thue-Morse sequence. In particular, one can use any number of symbols greater than one to get aperiodic sequences. One can also use generalizations of substitutions which generate directly two-dimensional patterns.

In a configuration where one can trade memory space for computation time, symbolic sequences may be embedded in short algorithms, as well known by people versed in symbolic dynamics and/or formal language theory. Furthermore, these theories have developed a large number of methods different from substitutions to generate aperiodic or even very aperiodic symbolic sequences.

Preferred Embodiment for Generating Compatible Masks

We first list the components we use in the construction of compatible masks in the preferred embodiment. For clarity, we restrict the discussion to two compatible masks, but the construction is easily generalized to more than two compatible masks.

The goal is to construct dither matrices A and B which are compatible. We accomplish this by constructing the matrix C. From the geometric point of view, the dither matrices A, B and C are rectangles: we have described the sizes of these matrices and the way they relate to each other in the summary of the invention. The construction of C will be implemented by assuming periodic boundary conditions so that C can be thought of as being a two-dimensional torus. Whenever we speak of the distance between two points in C or use a related concept, we mean the distance on the torus and not on the rectangle. We will use the symbols A, B and C to designate either the arrays given in the form of matrices, or the corresponding rectangles, or the corresponding torus (in the case of C). It should be clear whether we mean the matrix, the rectangle, the torus, or whichever.

With $\mathbb{R}$ standing for the set of real numbers, and $\mathbb{R}$ standing for the plane parameterized by two coordinates which are real numbers, we chose some function $r:\mathbb{R}\to$ with a maximum at the origin and decreasing when moving away from the origin. To simplify the computation, the range of the potential will be chosen to be finite. The function r is to be interpreted as a potential function. The function r(x,y) will be chosen to depend on the distance from (x,y) to the origin, and the distance can be adapted to the particular printer, standard choices being the Euclidean distance $$\sqrt{x^2+y^2},$$

Figure 6:
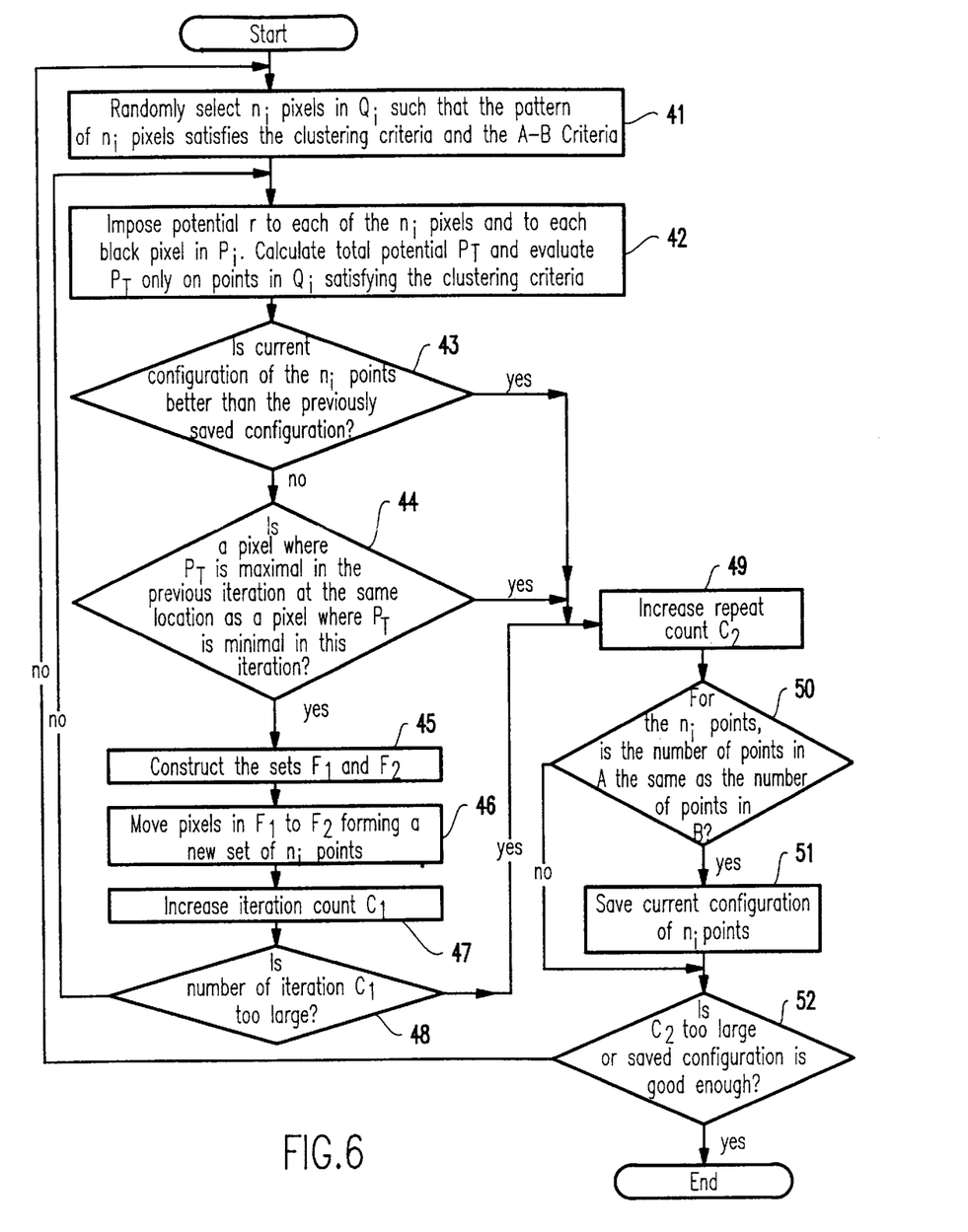
FIG. 6 is flow diagram showing the iterative procedure for arranging pixels called by the process of FIG. 5.

$|x|+|y|$ or max $(|x|, |y|)$. For instance, r can be chosen to be $$e^{\frac{-x^2-y^2}{4.5}}$$

when $|x|$ and $|y|$ are smaller than the horizontal and vertical sizes of the mask, respectively, and zero otherwise. Better results are obtained by choosing a potential r which depends on the grey level $g_i$ one works with (see function block 42 in FIG. 6).

A pattern in this document is an m by n matrix of 0s and 1s or a 2 m by 3 n matrix of 0s and 1s. The 0s correspond to white pixels and the 1s correspond to black pixels. To each pattern $P_i$ corresponds a grey level $g_i$ ($0 \le g_i \le 1$) which is defined as the proportion of black pixels in $P_i$. Recall that C is a 2 m by 3 n matrix.

Let us introduce some terminology. We say a pattern for C (i.e., a 2 m by 3 n matrix of 0s and 1s) satisfy the A-B criteria if it can be decomposed in the structure shown in FIG. 3. In other words, the pattern consists of patterns for A and B according to the structure in FIG. 3. We also call such a pattern A-B compatible. Similarly, we say a set of pixels in C satisfy the A-B criteria if it can be decomposed in the structure shown in FIG. 3. In other words, the pixels consist of pixels in A and B according to the structure in FIG. 3. We also call such a set of pixels A-B compatible. We say a pixel in C lies in A (or B) if following the decomposition in FIG. 3, the point lies in A (or B, respectively).

Given a black pixel in C, it is easy to see that there exist a unique A-D compatible pattern of three black pixels which contain the black pixel in question. We will now briefly describe the preferred embodiment for generating compatible masks. We choose a sequence of "good" patterns for C satisfying the A-B criteria which are visually pleasing and/or desirable according to some criteria; e.g., a clustering criteria. Each pattern is used to render a particular level of grey. The sequence of patterns must satisfy the following subset condition: For any two patterns $P_i$ and $P_{i+1}$, any pixel which is black in $P_i$ is also black in $P_{i+1}$. It is clear that if set patterns for C satisfies the A-B criteria and the subset condition, then the corresponding patterns for A and B also satisfy the subset condition. The number of patterns for C in this sequence is less than the total number of grey levels and contains at least two patterns: all 0s and all 1s. Additional patterns are added corresponding to any intermediate patterns which are considered "good" and which we want to appear in the final mask. The 2 m by 3 n dither mask C is initialized so as to generate these patterns at the corresponding grey levels.

By clusters we mean any grouping of black dots. In the preferred embodiment, this grouping might be chosen to favor reproducibility or allow visibility of white dots when the grey level is high. Printing on a laser or xerographic printer has such requirements. We do not necessarily aim at forming clusters as round as possible; the clusters could have complex shapes. The shape of the clusters may depend on the printer or on the type of documents one intends to print. In the preferred embodiment, the clusters are formed by adding dots which are adjacent to each other. The property of being adjacent is determined according to the application and can depend on the grey level being dealt with (i.e., the number of black pixels in the pattern). For example, in one application, two pixels may be considered adjacent if they are immediate vertical or horizontal neighbors. In another application, diagonal relationships may be preferred.

To complete the mask, the entries of the mask for halftoning intermediate grey levels are determined by using the potential r to satisfy an aperiodicity criterion, a clustering criteria, and a A-B compatibility criterion.

Figure 5:
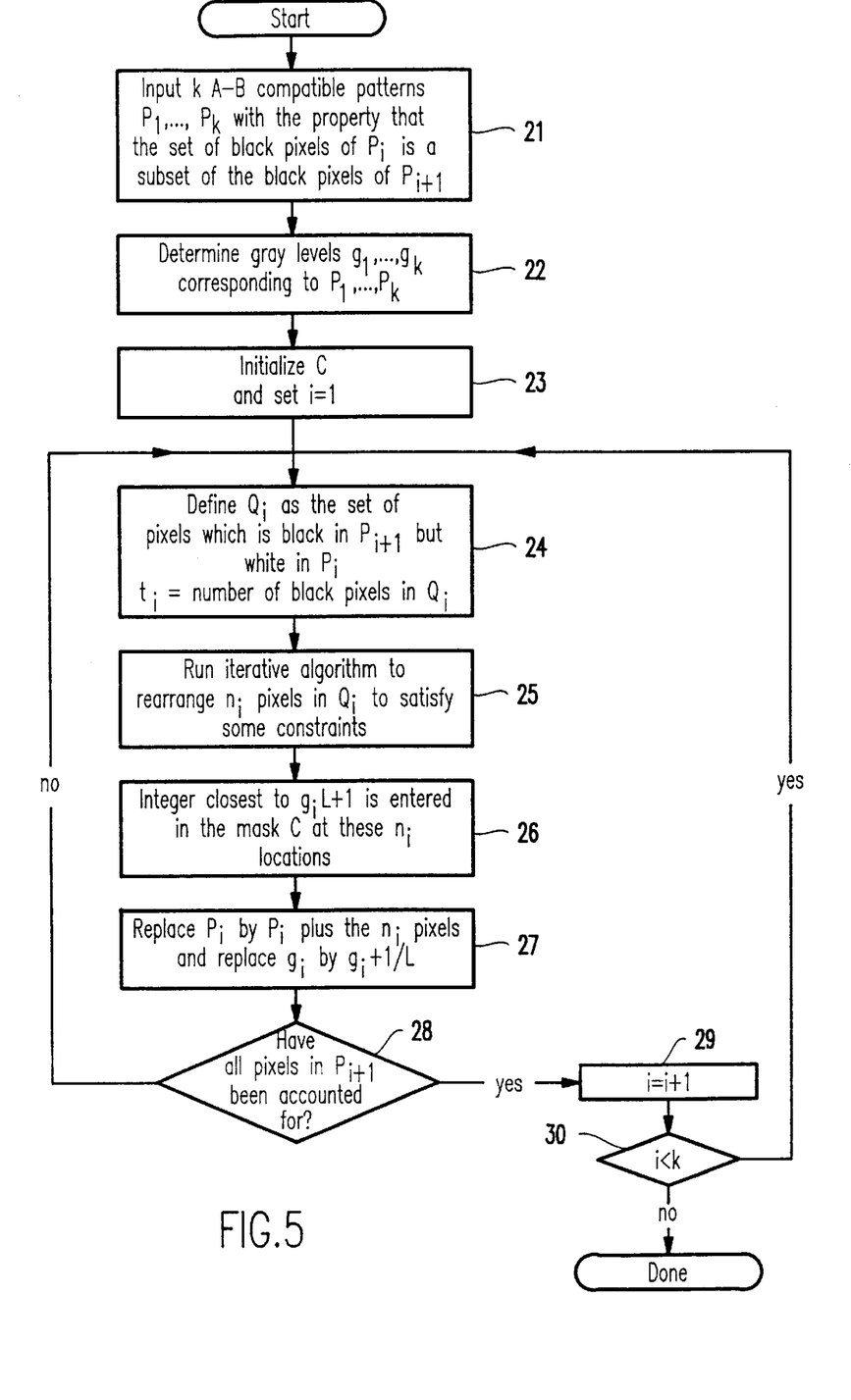
FIG. 5 is flow diagram showing the process of generating two compatible dither masks for the system of FIG. 4.

Detailed Description of the Preferred Embodiment for Generating Compatible Masks A flow diagram of the algorithm which generates a 2 m by 3 n dither matrix C is shown in FIG. 5. First, we choose in function block 21 an ordered sequence of k "good" A-B compatible patterns of black and white pixels, $p_1, \ldots, p_k$, satisfying the subset condition as described earlier. Each pattern has size 2 m by 3 n. Recall that for each pattern $P_i$, the corresponding grey level $g_i$ ($0 \leq g_i \leq 1$) is defined as $g_i$=(number of black pixels in $P_i$)/(6 nm), as determined in function block 22.

In the preferred embodiment, the patterns $P_i$ are (possibly periodic) patterns which look pleasant. For example, one of the patterns could be where the black pixels are arranged in a checkerboard pattern.

We choose $P_1$ as the zero matrix (pattern of all white pixels), i.e., the corresponding grey level $g_0$ is equal to 0. We choose $P_k$ as the pattern of black pixels (i.e., a matrix of all 1s) with corresponding grey level $g_k$=1. Recall that L+1 is the number of grey levels to be represented and C is the 2 m by 3 n dither matrix. We first initialize the mask C in function block 23 as follows:

1. For each black pixel in $P_1$, we set the corresponding entry in C to be $g_1 \times L$, rounded to an integer.
2. For each black pixel in $P_2$ which is not in $P_1$, we set the corresponding entry in C to be $g_2 \times L$, rounded to an integer.
3. For each black pixel in $P_i$ which is not in $P_1, \ldots, P_{i-1}$, we set the corresponding entry in C to be $g_i \times L$, rounded to an integer.

Next, we complete the mask in the following way. For each pair of adjacent patterns $P_i$ and $P_{i+1}$, we fill in the mask to generate the halftones for the grey levels between $g_i$ and $g_{i+1}$.

Starting with i=1, we define in function block 24 $Q_i$ as the set of pixels which is black in $P_{i+1}$, but not in $P_i$. The number of pixels in $Q_i$ is denoted $t_i$. Choose an integer $n_i$ divisible by six and approximately equal to $t_i/(L \times (g_{i+1}-g_i))$. Next, an iterative scheme is used in function block 25 to rearrange $n_i$ pixels in $Q_i$ such that they satisfy five constraints as follows:

I. These $n_i$ pixels remain within $Q_i$;
II. These pixels, along with $P_i$, form a sufficiently aperiodic pattern;
III. These $n_i$ pixels, along with $P_i$, satisfy some clustering criteria;
IV. These $n_i$ pixels form a A-B compatible pattern; and
V. Half of the pixels are in A and half of them are in B. (The definition of a pixel in C being in A (or B) is described earlier.)

The clustering criteria should be chosen such that the points in $Q_i$ which satisfy the clustering criteria form a A-B compatible set.

After that, the integer closest to $g_i \times L+1$ is entered in the mask at these $n_i$ locations in function block 26. This guarantees that $P_i$ plus these pixels will be the pattern corresponding to a grey level approximately equal to $g_i+1/L$. We replace $P_i$ by $P_i$ plus the $n_i$ pixels (i.e., make these $n_i$ pixels black and add them to $P_i$) and replace $g_i$ by $g_i+1/L$ in function block 27. We then repeat the above steps by jumping back to function block 24. This continues until all grey levels between $g_i$ and $g_{i+1}$ are accounted for; i.e., we have placed an entry in C at the locations of all black pixels in $P_{i+1}$. This is tested for in decision block 28.

We then increment i in function block 29 to fill in the mask for the grey levels between the next pair of grey levels ($g_i$, $g_{i+1}$) by jumping back to function block 24. This continues until the entire mask C is finished, i.e., all the grey levels have been taken care of. This is tested for in decision block 30.

The iterative scheme for arranging the $n_i$ pixels in function block 25 is implemented in the following way, as illustrated in FIG. 6. In function block 41, we randomly select $n_i$ locations in $Q_i$ which satisfy the clustering criteria until we find one which is A-B compatible. We impose a potential r centered on each of the $n_i$ points and on each of the black pixels in $P_i$ in function block 42. The sum of these potentials, which we denote by $P_T$ (the total potential), is then calculated only for each point in $Q_i$ which satisfies the clustering criteria. The potential r can depend on $g_i$.

In decision block 43, the configuration of $n_i$ points is tested to see if it is better than the previously saved configuration. Better could mean, for instance, that the largest value minus the smallest value of the corresponding $P_T$ over all points in $Q_i$ satisfying the clustering criteria is smaller. If so, the algorithm jumps to function block 49. Otherwise, the algorithm moves on to decision block 44.

A test is made in decision block 44 to determine if a pixel having the minimal total potential $P_T$ is a pixel with the maximal total potential $P_T$ in the previous iteration. If so, the algorithm jumps to function block 49. Note that at the first iteration, this test in decision block 44 is not done and the algorithm jumps directly to function block 45. In function block 45, we take one of the $n_i$ points with the highest total potential and construct the unique set of three pixels which include this point and is A-B compatible. We call this set $F_1$. It is easy to see that $F_1$ is a subset of the $n_i$ points. We then take one of the points in $Q_i$ satisfying the clustering criteria with the lowest total potential and construct the unique set of three pixels which include this point and is A-B compatible. We call this set $F_2$. Again, by our choice of the clustering criteria, $F_2$ is a subset of $Q_i$.

In function block 46, the pixels in $F_1$ are moved to $F_2$ forming a new set of $n_i$ pixels. The iteration count $C_1$ is then incremented in function block 47. A test is made in decision block 48 to determine if the iteration count $C_1$ is larger than some predetermined maximum. If so, the algorithm jumps to function block 49. Otherwise, the algorithm jumps back to decision block 42 for another iteration.

In function block 49, the repeat count $C_2$ is increased. Then, in decision block 50, a test is made to see if the configuration of $n_i$ pixels have the same number of points in A as in B. If so, the configuration is saved in function block 51. A test is made in decision block 52 to see if $C_2$ is larger than some predetermined maximum or if the saved configuration of the $n_i$ locations form a sufficiently blue pattern. If not, a new random set of $n_i$ locations in $Q_i$ is chosen by jumping to function block 41. Otherwise, the saved configuration of the $n_1$ points will be the final configuration to be used in function block 25 of FIG. 5.

The clustering criteria used in the preferred embodiment can be stated as follows: A pixel in $Q_i$ satisfies the clustering criteria if either $g_i$ is less than h or the pixel is adjacent to black pixels in $P_i$. In the preferred embodiment, a pixel a is adjacent to another pixel b if a is one of the eight immediate neighbors of b. Another definition of adjacent that can be used is: a pixel a is adjacent to pixel b if a is immediately above, below, to the left or to the right of b. Note that this distance relationship is on C considered as a torus. The number h indicates that the pattern for $g_i$<h does not need to be clustered. Roughly speaking, the number h is determined by the number of cells in the mask.

Next C is decomposed into A and B according to the structure in FIG. 3. A and B will then be two compatible masks to be used in FIG. 4, i.e., in the notation of FIG. 4, $A=M^0$, $B=M^1$.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for the halftoning of an image comprising the steps of:

generating a plurality of threshold values for an array, wherein a smallest repeating rectangular block of threshold values for said array has n×m elements and said array requires only memory on the order of n+m elements to store information necessary needed to reconstitute said array;

comparing pixel-by-pixel an image against said array of threshold values; and outputting a decision to display or print a dot or not depending on an outcome of the comparing step.

2. The method of claim 1 wherein the step of generating said threshold values comprises the steps of:

computing a plurality of smaller compatible masks to form threshold values, said smaller compatible masks being interchangeable side by side to halftone an input image without introducing artifacts due to the use of more than one mask;

storing the plurality of smaller compatible masks in memory; and selecting among the smaller compatible masks during the step of comparing to generate said threshold values.

3. The method recited in claim 2 wherein the smaller compatible masks are selected to watermark a printed image without compromising the quality of the image.

4. The method of claim 2 wherein the image is selected from greyscale images and color images.

5. The method of claim 2 wherein the image is printed.

6. The method of claim 2 wherein the image is displayed as a multi-bit display.

7. The method of claim 2 further comprising the step of scanning an image into an image store prior to the step of comparing.

8. The method of claim 2, wherein the step of computing a plurality of smaller compatible masks comprises the step of choosing an ordered sequence of A-B compatible patterns of m by n pixels, said A-B compatible patterns taken from a pattern C of 2 m by 3 n pixels.

9. An apparatus for the halftoning of an image comprising:

an image storage for storing an image $I_{u,v}$ where (u,v) is a pixel location;

a collection of T m by n dither matrices $M^t=\{a^t_{i,j}\}$, where the members of the set $\{a^t_{i,j}\}$ for t=0, . . . , T−1 are numbers between 0 and L which represent threshold levels stored in dither matrices;

a matrix G with entries in the range $\{0,1, \ldots, T-1\}$, the entries of G forming an aperiodic array;

a dither array selector calculating an integer $t'=G_{g,h}$, wherein, for u and v, integers g and h are defined as the smallest integer larger than u/m and v/n, respectively, the dither array selector then selecting a dither mask $M^{t'}$ based on the calculation;

a comparator comparing pixels in the image storage with the selected dither mask and generating a printing decision ($D_{u,v}$), a pixel at location (u,v) in image storage being identified by $D_{u,v}$ as a dot if and only if a grey level on the image to be printed at location (u,v) is at least equal to $a^{t'}_{u',v'}$ where u'=u mod m and v'=v mod n; and a printer receiving $D_{u,v}$ and printing a dot or not as a function of $D_{u,v}$.

10. The printing apparatus recited in claim 9 further comprising a scanner for scanning an input image, the image storage being connected to the scanner and storing a scanned image.

11. The printing apparatus recited in claim 9 wherein T=2 and G is a matrix of 0s and 1s which form an aperiodic array.

12. A method for constructing a large aperiodic mask used for halftoning of images comprising the steps of:

computing a plurality of smaller compatible masks to replace a larger aperiodic mask, said smaller compatible masks being interchangeable side by side to halftone an input image without introducing artifacts due to the use of more than one mask; and selecting among the smaller compatible masks to construct the large aperiodic mask, wherein a smallest repeating rectangular block of threshold values for each smaller compatible mask has n×m elements and only memory on the order of n+m elements is required to store information needed to represent said large aperiodic mask.

13. A method for constructing a large aperiodic mask used for halftoning of images comprising the steps of:

computing several smaller compatible masks to replace a larger aperiodic mask, said smaller compatible masks being interchangeable side by side to halftone an input image without introducing artifacts due to the use of more than one mask, further comprising the step of choosing an ordered sequence of A-B compatible patterns of m by n pixels, the A-B compatible patterns being used to form a pattern C of 2 m by 3 n pixels; and selecting among the smaller compatible masks to construct the large aperiodic mask.

\* \* \* \* \*